Oct. 16, 1962 F. L. HAUSHALTER 3,058,371
VIBRATION DAMPENER
Filed Nov. 29, 1960
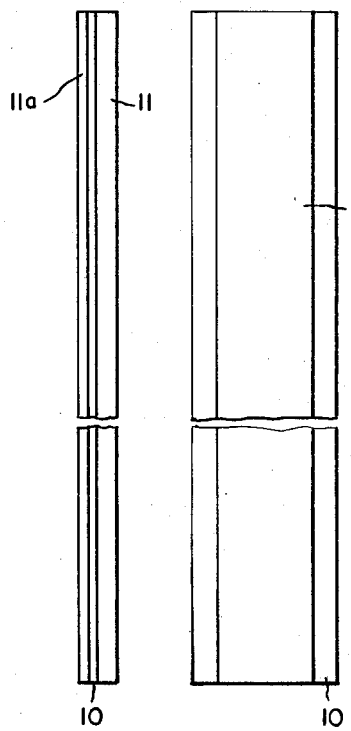
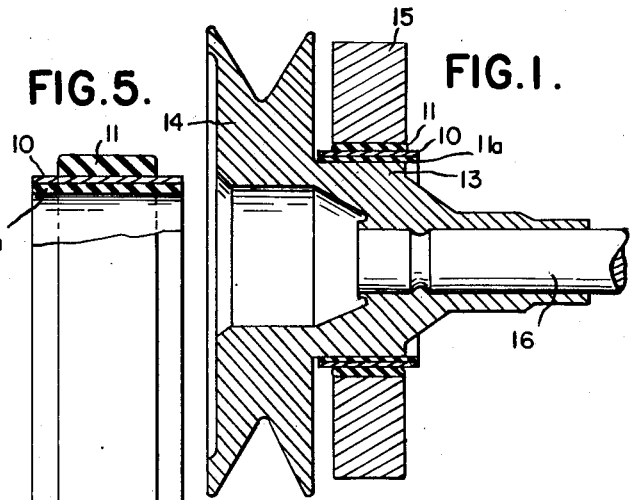
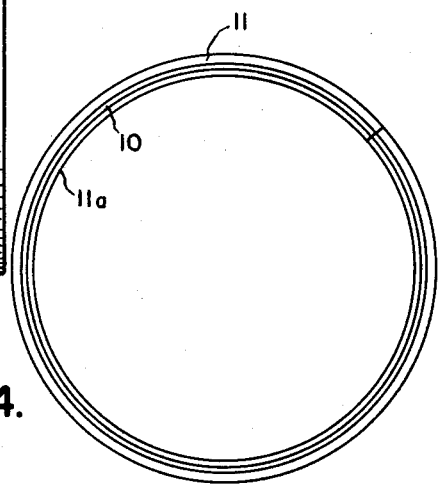
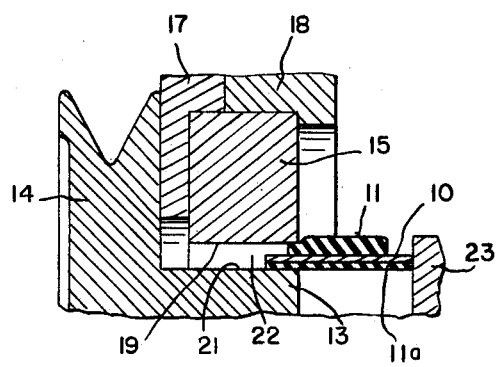
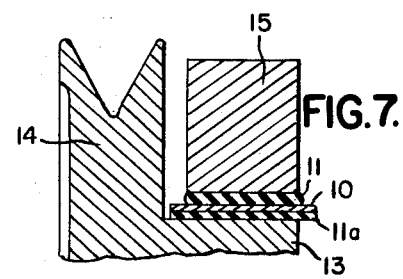
INVENTOR.
FRED L. HAUSHALTER
BY
*Whittemore, Hulbert & Belknap*
ATTORNEYS

United States Patent Office

3,058,371
Patented Oct. 16, 1962

3,058,371
VIBRATION DAMPENER
Fred L. Haushalter, 2185 Scott Lake Road, Pontiac, Mich.
Filed Nov. 29, 1960, Ser. No. 72,396
5 Claims. (Cl. 74—574)

This invention relates generally to vibration dampeners and refers more particularly to a vibration dampener having spaced apart inner and outer relatively rotatable members provided with opposed cylindrical surfaces concentric with the axis of rotation of said members and providing an annular space therebetween, and a yieldable connection between said rotatable members comprising a separate composite unit disposed within the annular space between said cylindrical surfaces.

This application constitutes a continuation-in-part of my application filed May 2, 1960, bearing Serial No. 26,210.

One of the essential objects of the invention is to provide a vibration dampener wherein the composite unit is preformed before being inserted into the annular space between the opposed concentric surfaces of the spaced apart inner and outer relatively rotatable members.

Another object is to provide a vibration dampener wherein the preformed composite unit is so formed that such unit may be quickly and easily inserted into the annular space mentioned.

Another object is to provide a vibration dampener wherein the preformed composite unit includes elastic material that is adapted to be stretched axially and made thinner within the annular space during insertion of the unit into the annular space.

Another object is to provide a vibration dampener wherein uniformity of stretch or stress in the elastic material may be obtained when the preformed unit is inserted into the annular space, regardless of how much the width of the opposed concentric surfaces may exceed the width of the elastic material.

Another object is to provide a vibration dampener wherein the preformed composite unit includes a relatively thin annular metal strip that may constitute the means by which the composite unit, including the elastic material, may be inserted into the annular space between the opposed substantially concentric surfaces of the spaced apart relatively rotatable members.

Another object is to provide a vibration dampener wherein the elastic material is in the form of separate continuous strips which are permanently bonded in surface to surface relation to opposite sides of the metal strip mentioned before the preformed composite unit is inserted into the annular space.

Another object is to provide a vibration dampener in which the yieldable connection between the rotatable members is effected solely by the composite unit disposed within the annular space between the relatively rotatable members.

Another object is to provide a vibration dampener wherein the combined or over-all cross sectional thickness of the metal strip and elastic material bonded thereto is initially greater than the radial width of the annular space mentioned, whereby the elastic material is under compression between the opposed substantially concentric surfaces of the rotatable members after the preformed composite unit has been inserted into the annular space mentioned.

Other objects, advantages and novel details of construction of this invention will be made more apparent as this description proceeds, especially when considered in connection with the accompanying drawings wherein:

FIGURE 1 is a cross sectional view of an assembly in which the vibration dampener embodying my invention is incorporated.

FIGURE 2 is a fragmentary top plan view of the initial form of the insert employed in the invention.

FIGURE 3 is an edge view of the insert shown in FIGURE 2.

FIGURE 4 is an edge view of the insert shown in FIGURES 2 and 3 when bent to circular form for insertion into the assembly.

FIGURE 5 is a side view, partly in section, of the insert shown in FIGURE 4.

FIGURE 6 is a fragmentary sectional view of the insert and rotatable concentric members prior to the introduction of the insert, together with forms and the tool employed during the inserting operation.

FIGURE 7 is a fragmentary sectional view of the assembly after the insert has been forced into said assembly.

Initially, the insert comprises a flat rectangular thin metal strip 10, preferably formed of steel, to opposite sides of which are bonded shaped continuous resilient strips 11 and 11a, preferably formed from rubber or other curable elastomer having an affinity for the steel of the strip 10.

The resilient elements 11 and 11a are permanently bonded to opposite sides or faces of the metal strip 10 by curing said elements to the strip. By initially bonding the elements 11 and 11a to the thin metal strip, a preformed composite unit is obtained.

The steel strip 10, with the resilient elements 11 and 11a bonded thereto, can then be bent into circular form. This is preferable to bonding a continuous ring of rubber or the like onto the inner surface of a cast iron inertia member, and then pressing such assembly onto a hub member with the aid of a lubricant because such procedure involves quite costly molds. In fact, a better bond is obtained on steel than on cast iron.

After the composite unit has been bent to circular form, as shown in FIGURE 4, such composite unit may then be forced axially into the annular space between concentric surfaces respectively of a rotatable body, such as the hub 13 of a pulley 14, and an inertia member 15 which may be an annular mass of metal. The pulley 14 may be keyed to a crankshaft 16, in any suitable manner.

To facilitate the insertion of the preformed composite unit into the annular space between the hub 13 and the inertia member 15, I provide a fixture comprising two spaced sections 17 and 18 which position the inertia member 15 with respect to the hub 13 so that the opposed surfaces 19 and 21 respectively of the inertia member and hub are maintained in concentric relation, and thereby provide an annular space 22 between said members 13 and 15. The radial width of the annular space 22 between the members 13 and 15 is less than the initial combined over-all cross sectional thickness of the composite unit forming the yieldable insert.

The forward face of the pulley 14 is positioned in abutting relation to a fixed frame (not shown), after which a suitable annular tool, a portion of which is indicated at 23, may be employed to impose sufficient pressure on the outer free edge of the metal strip 10 to force the preformed composite insert into the annular space 22. Since the radial width of this space 22 is less than the initial thickness of the composite unit forming the insert, the rubber of said unit will be stretched a substantial amount and will be placed under tension as it is forced between the concentric surfaces 19 and 21 respectively of the hub 13 and inertia member 15. At the same time, the rubber of the composite unit tends to assume its original form, and since it is disposed within a space less than that of the initial thickness of the composite unit, such rubber will also be under compression.

When the composite unit is fully introduced into the annular space 22, as shown in FIGURE 7, the rubber of said unit is elongated axially and is under compression but the tendency of the rubber to resume its initial form effects an intimate firm frictional bond between the insert and the spaced apart hub 13 and inertia member 15.

In the present instance, the elastic strips 11 and 11a are entirely separate from and independent of one another, and one of said elastic strips, preferably the strip 11a is thinner than the other strip 11. In this connection, the thickness of the elastic strip 11 is uniform throughout its circumference, and the thickness of the elastic strip 11a is uniform throughout its circumference. Moreover, the width of the thinner strip 11a is substantially equal to the width of the metal strip 10, whereby opposite circumferentially extending edges of said thinner strip 11a are substantially flush with the circumferentially extending edges of said metal strip. Also, the width of the elastic strip 11 is uniform throughout its circumference, and the width of the elastic strip 11a is uniform throughout its circumference. However, the width of the elastic strip 11 is less than the width of the metal strip 10.

It will also be noted, by referring to FIGURE 5, that the elastic strip 11 is centered with respect to the surface of the metal strip 10 to which it is bonded, whereby opposite circumferentially extending edges of said elastic strip 11 are equally spaced inwardly from the circumferentially extending edges of the metal strip 10.

Although the bonding of the resilient strips 11 and 11a to the metal strip 10 is preferably effected by curing the rubber of such strips 11 and 11a to the metal of the strip 10, such rubber may be adhered to the metal by other suitable methods, such as by suitable adhesives or by suitable cement. Although it is preferred that the resilient strips 11 and 11a are initially bonded to a substantially flat elongated metal strip such as 10, and that the composite unit so formed is then bent to circular form to be inserted as a preformed composite unit into the annular space 22 between the opposed concentric surfaces 19 and 21 respectively of the inertia member 15 and hub 13, it is within the concept of my invention to bond the resilient strips 11 and 11a to the metal strip 10 after it has been bent into circular form.

What I claim as my invention is:

1. The combination with spaced apart inner and outer relatively rotatable members provided with opposed cylindrical surfaces concentric with the axis of rotation of said members and providing an annular space therebetween, of a yieldable connection between said rotatable members disposed within said annular space and comprising a separate preformed composite insert including a relatively thin substantially annular metal strip within said annular space between and concentric with said cylindrical surfaces, and continuous substantially annular strips of elastic material constituting vibration dampening means for said rotatable members extending circumferentially of and respectively bonded permanently in surface-to-surface relation to the radially opposite surfaces of said metal strip and respectively disposed in surface-to-surface frictional engagement with the opposed cylindrical surfaces of said rotatable members, the radial width of the annular space aforesaid being less than the initial combined overall cross-sectional thickness of said metal strip and said elastic strips in the free state of said elastic strips, whereby said entire insert is under compression between said cylindrical surfaces, one of said elastic strips being relatively thick and capable of substantial radial compression, the other of said elastic strips being relatively thin as compared with the said one of said elastic strips.

2. The structure defined in claim 1, wherein the width of the thinner strip is substantially equal to the width of the metal strip, whereby the opposite circumferentially extending edges of said thinner strip are substantially flush with the circumferentially extending edges of said metal strip.

3. The structure defined in claim 1, wherein the width of the thicker strip is less than the width of said metal strip, and the thicker strip is centered with respect to said metal strip, whereby opposite circumferentially extending edges of said thicker strip are spaced axially inwardly equal distances from the circumferentially extending edges of said metal strip.

4. The combination with spaced apart inner and outer relatively rotatable members provided with opposed cylindrical surfaces concentric with the axis of rotation of said members and providing an annular space therebetween, of a yieldable connection between said rotatable members disposed within said annular space and comprising a separate preformed composite insert including a relatively thin substantially annular metal strip within said annular space between and concentric with said cylindrical surfaces, elastic material bonded permanently in surface-to-surface relation to one of the radially facing surfaces of said strip and disposed in surface-to-surface frictional engagement with the cylindrical surface of one of said rotatable members, and friction material bonded permanently in surface-to-surface relation to the other of the radially facing surfaces of said strip and disposed in surface-to-surface frictional engagement with the cylindrical surface of the other of said rotatable members, the radial width of the annular space aforesaid being less than the initial combined overall cross-sectional thickness of said strip and the material bonded to opposite surfaces thereof in the free state of said material, whereby said entire insert is under compression between said cylindrical surfaces, said elastic material being relatively thick as compared with the friction material and capable of substantial radial compression.

5. The structure defined in claim 4, wherein said elastic material is in the form of a continuous substantially annular strip.

References Cited in the file of this patent

UNITED STATES PATENTS

| | | |
|---|---|---|
| 2,594,555 | Hardy | Apr. 29, 1952 |
| 2,795,036 | Haushalter | June 11, 1957 |
| 2,878,689 | Aebersold | Mar. 24, 1959 |

FOREIGN PATENTS

| | | |
|---|---|---|
| 937,319 | Germany | Jan. 5, 1956 |